(12) United States Patent
Chen

(10) Patent No.: US 9,929,552 B2
(45) Date of Patent: Mar. 27, 2018

(54) CABLE FIXING ASSEMBLY

(71) Applicant: PHIHONG TECHNOLOGY CO., LTD., Taoyuan County (TW)

(72) Inventor: Hsing-Kuang Chen, New Taipei (TW)

(73) Assignee: PHIHONG TECHNOLOGY CO., LTD, Taoyuan (TW)

( * ) Notice: Subject to any disclaimer, the term of this patent is extended or adjusted under 35 U.S.C. 154(b) by 518 days.

(21) Appl. No.: 13/855,732

(22) Filed: Apr. 3, 2013

(65) Prior Publication Data

US 2014/0209378 A1    Jul. 31, 2014

(30) Foreign Application Priority Data

Jan. 28, 2013   (TW) .............................. 102103209 A

(51) Int. Cl.
| | |
|---|---|
| *H02G 3/22* | (2006.01) |
| *H01R 13/58* | (2006.01) |
| *H01R 13/625* | (2006.01) |
| *H01R 13/74* | (2006.01) |
| *H01R 24/00* | (2011.01) |
| *H01R 9/03* | (2006.01) |

(52) U.S. Cl.
CPC ............ *H02G 3/22* (2013.01); *H01R 13/58* (2013.01); *H01R 13/625* (2013.01); *H01R 13/74* (2013.01); *H01R 24/005* (2013.01); *H01R 9/03* (2013.01)

(58) Field of Classification Search
CPC .................................. H02G 3/22; H01R 13/58
USPC ................................................. 174/559, 659
See application file for complete search history.

(56) References Cited

U.S. PATENT DOCUMENTS

| | | | | |
|---|---|---|---|---|
| 5,239,133 | A  * | 8/1993 | Beck ................... | H01B 17/265 174/667 |
| 5,731,545 | A  * | 3/1998 | Reed ............................... | 174/66 |
| 6,995,316 | B1 * | 2/2006 | Goto ................... | H02G 15/013 16/2.1 |
| 2004/0000616 | A1* | 1/2004 | Finke ................. | B64D 11/0015 244/118.5 |

FOREIGN PATENT DOCUMENTS

| | | | | |
|---|---|---|---|---|
| CN | 10306789 | * | 9/2009 | ............. H01R 13/58 |
| CN | 102025078 | * | 4/2011 | ............. H01R 13/58 |

* cited by examiner

*Primary Examiner* — Dhirubhai R Patel
(74) *Attorney, Agent, or Firm* — Chih Feng Yeh; Huntington IP Consulting Co., Ltd.

(57) ABSTRACT

A cable head of a cable of a cable fixing assembly includes a joint portion and a lock body. The lock body is disposed on two opposite side surfaces of one end of the joint portion and extends therefrom. A fixing board of a cable fixing assembly includes a joint hole, a no-return block and a hook. The joint hole is formed through the fixing board. The no-return block is formed adjacent to the joint hole and includes a guiding slope and a no-return surface. The hook is disposed on the fixing board to fix conductive stranded wires in the cable body. The joint portion and the lock body are inserted into the joint hole and are rotated by an angle, and the lock body moves on the guiding slope and then is locked by the no-return surface.

11 Claims, 5 Drawing Sheets

CABLE FIXING ASSEMBLY

CROSS-REFERENCE TO RELATED APPLICATION

This application claims the benefit of TAIWAN patent application No. 102103209, filed Jan. 28, 2013, which are herein incorporated by reference.

TECHNICAL FIELD

The present invention relates to a cable, and more particularly to a cable fixing assembly.

BACKGROUND OF THE RELATED ART

Most of electronic devices have cables such as power cables or signal cables no matter what functions they have. The power cables can be utilized to transfer electric energy to the electronic devices while the signal cables can be employed to transfer signals to the electronic devices. The cables can be combined with the electronic devices in many ways, which can be generally divided into a detachable design and a non-detachable design.

The cable has to be detachable from the electronic device in the detachable design, where one end of the cable is designed as a plug and a socket which matches the plug is disposed in the electronic device, such that the plug may be inserted into the socket to combine the cable with the electronic device. The position in which the plug is disposed in the electronic device has to fit the configuration of the electronic components in the electronic device.

The cable is fixed on the electronic device in the non-detachable design and is not detachable from the electronic device, where a joint portion is designed on one end of the cable and the electronic device includes an upper housing and a lower housing. An upper joint notch and a lower joint notch are disposed in the upper housing and the lower housing correspondingly and respectively, such that the upper housing and the lower housing can be assembled to render the joint portion of the cable to be sandwiched between the upper joint notch and the lower joint notch. The position in which the cable is fixed in the electronic device only can be the position in which the upper housing is combined with the lower housing.

The electronic device with the conventional non-detachable design has a largely limited appearance because the cable is fixed on the assembling position in which the upper housing is combined with the lower housing. For instance, if it is desired that the cable cannot be easily seen on the appearance of the electronic device and the cable is combined with the bottom of the electronic device (the bottom of the lower housing), only the plug-socket design can be applied. However, if the cable needs not to be detachable from the electronic device, the plug-socket design will increase the manufacturing cost. To overcome this problem, some manufacturer disposes outer threads on the joint portion of the cable. After the cable passes through a circular through hole in the lower housing, a nut with an outer diameter larger than that of the circular through hole engages the outer thread of the joint portion, so as to combine the cable with the lower housing. However, the nut-outer thread design will cause additional assembling procedures and tools have to be employed to assemble them, thereby increasing the manufacturing cost.

SUMMARY

In one aspect, the present invention discloses a cable fixing assembly, including a cable and a fixing board. The cable includes a cable body, and a cable head disposed on an end of the cable body. The cable head includes a stress release portion, a joint portion and a lock body. A first end of the stress release portion is connected to the end of the cable body. A first end of the joint portion is disposed on an end surface of a second end of the stress release portion. The lock body is disposed on two opposite side surfaces of a second end of the joint portion and extends from the second end of the joint portion. The lock body may be annular sector shaped. The fixing board includes a joint hole, at least one no-return block and at least one hook. The joint hole is formed through the fixing board. The shape of the joint hole matches the entire shape of the joint portion and the lock body. The at least one no-return block is formed on the fixing board and adjacent to the joint hole. The at least one no-return block includes a guiding slope and a no-return surface. The at least one hook is disposed on the fixing board to fix conductive stranded wires in the cable body of the cable. The joint portion and the lock body are inserted into the joint hole and are rotated by an angle, and the lock body moves on the guiding slope and is locked by the no-return surface.

One advantage of the present invention is that the cable can be steadily fixed on the combinative case in the situation that the position in which the cable is fixed is not limited.

Another advantage of the present invention is that the present invention can fix or hide the conductive stranded wires exposed from the cable head.

These and other advantages will become apparent from the following description of preferred embodiments taken together with the accompanying drawings and the appended claims.

BRIEF DESCRIPTION OF THE DRAWINGS

The present invention may be understood by some preferred embodiments and detailed descriptions in the specification and the attached drawings below.

DETAILED DESCRIPTION

The present invention will now be described with the preferred embodiments and aspects and these descriptions interpret structure and procedures of the present invention only for illustrating but not for limiting the Claims of the present invention. Therefore, except the preferred embodiments in the specification, the present invention may also be widely used in other embodiments.

Figure 1:
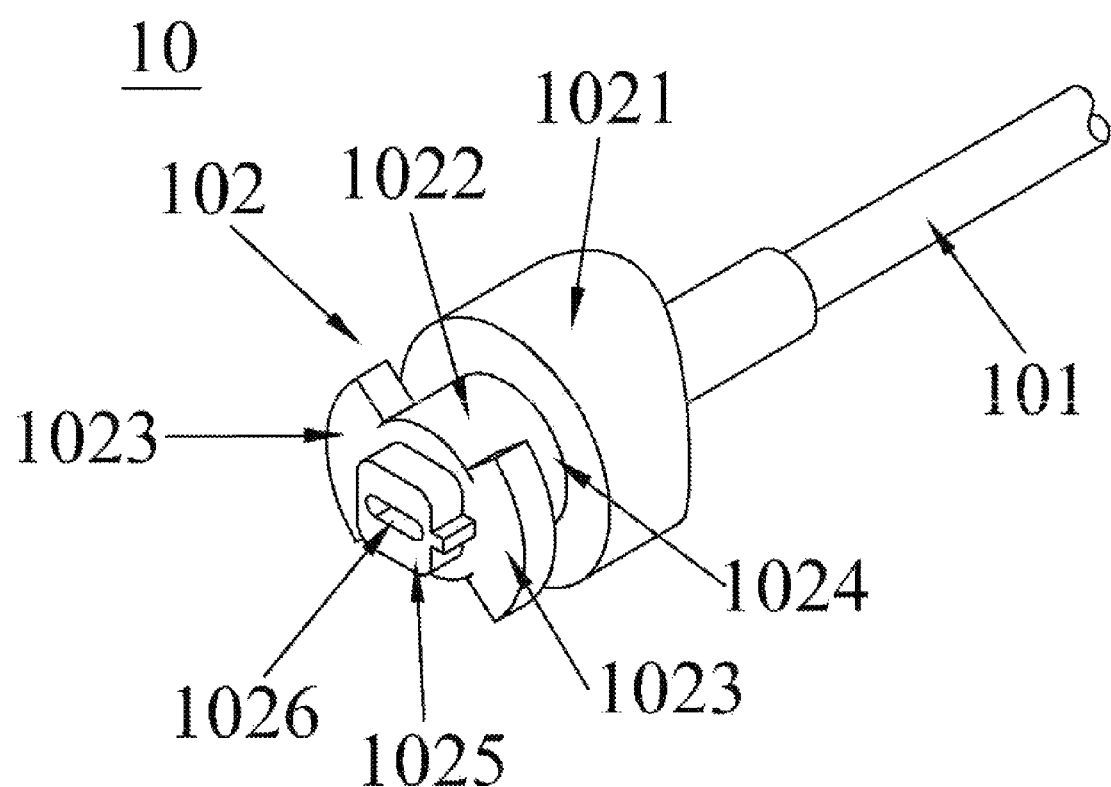
FIG. 1 illustrates a diagram of a cable in accordance with one embodiment of the present invention.
Figure 2:
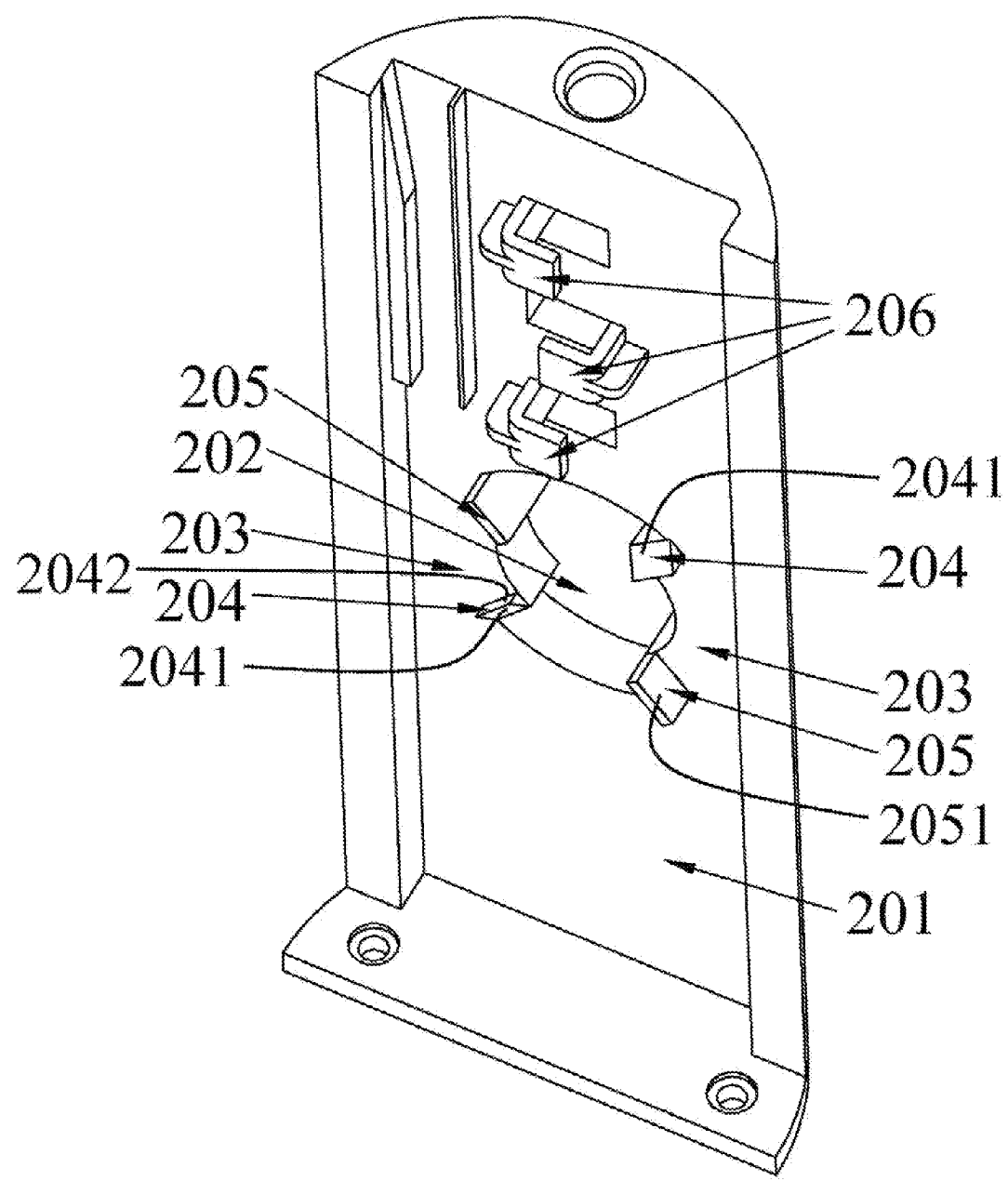
FIG. 2 illustrates a diagram of a fixing board in accordance with one embodiment of the present invention.
Figure 3:
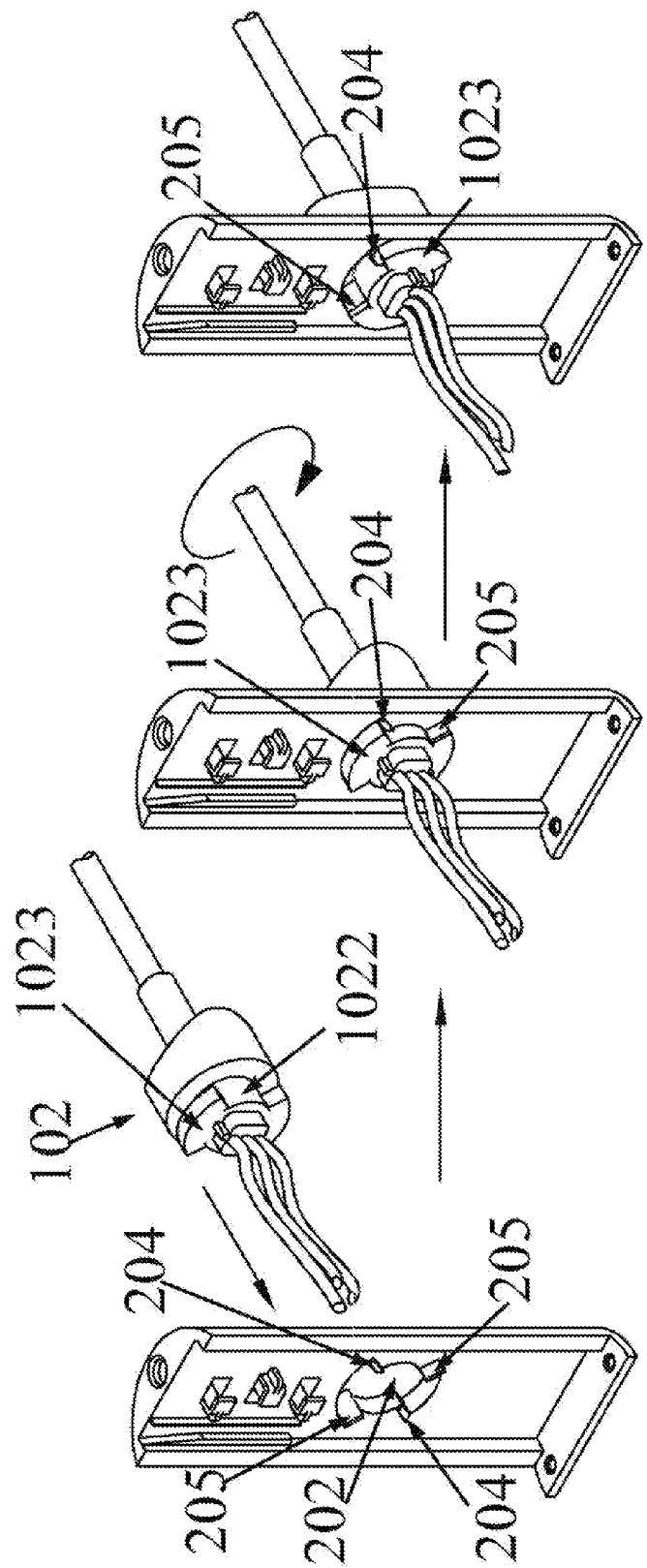
FIG. 3 illustrates a diagram showing the assembling steps of a cable fixing assembly in accordance with one embodiment of the present invention.
Figure 4:
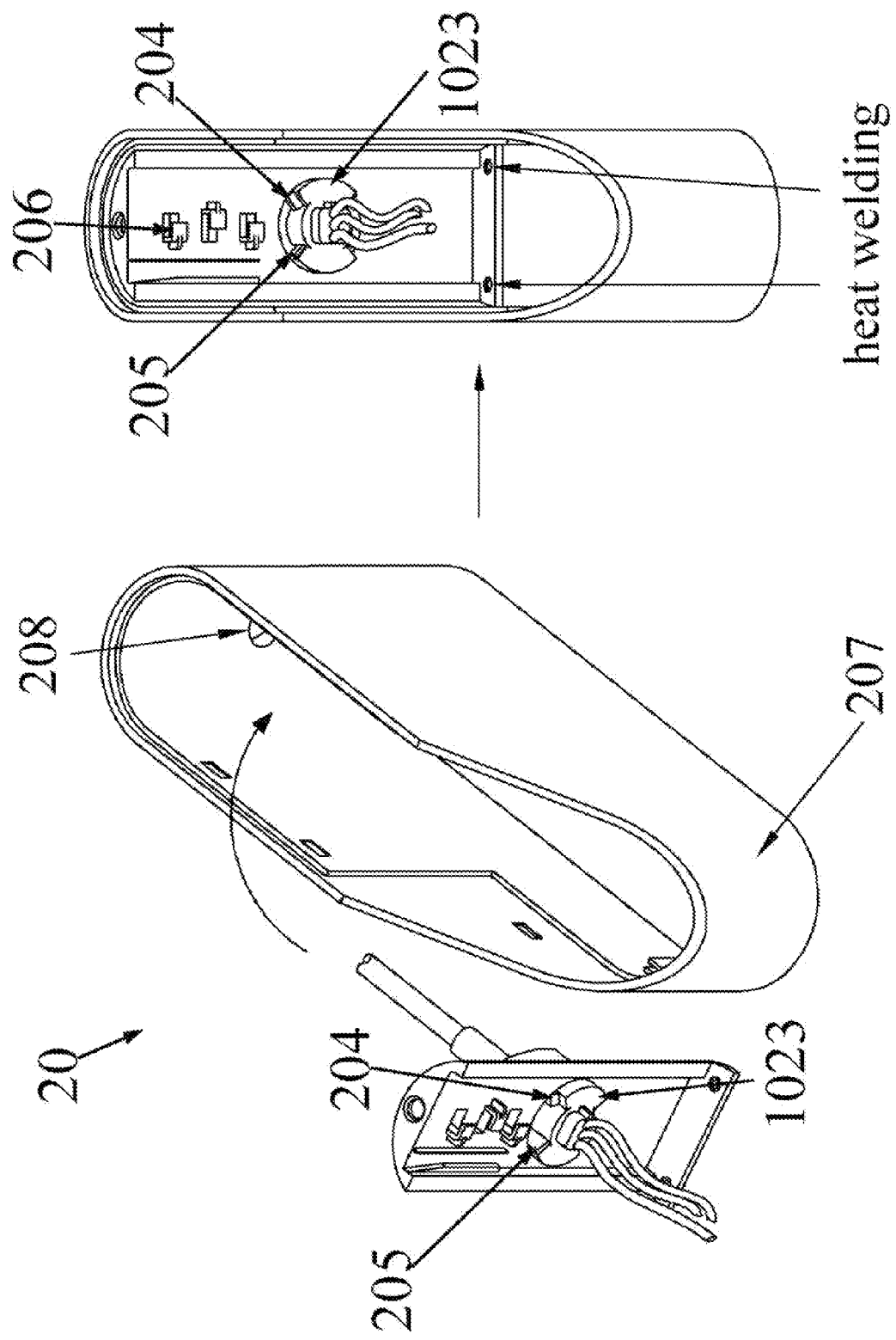
FIG. 4 illustrates a diagram showing the assembling steps of the cable fixing assembly in accordance with one embodiment of the present invention.

The present invention discloses a cable fixing assembly. As shown in FIGS. 1, 2 and 4, in accordance with one embodiment of the present invention, the cable fixing assembly of the present invention includes a cable 10 and a combinative case 20. In one embodiment, as shown in FIG. 1, the cable 10 includes a cable body 101 and a cable head 102. With reference to FIG. 3, the cable body 101 includes an insulating outer layer and conductive stranded wires wrapped in the insulating outer layer. The conductive stranded wires at one end of the cable head 102 are exposed as shown in FIG. 3. As shown in FIG. 1, the cable body 101 has two ends, and one end is disposed with a known connector (not shown) while the other end is disposed with the cable head 102. Referring to FIG. 1, the cable head 102 includes a stress release portion 1021, a joint portion 1022 and a terminal portion 1025 in order from the end of the cable body 101. The first end of the stress release portion 1021 is connected to the cable body 101, and in one embodiment, the stress release portion 1021 may be formed with relatively soft insulating rubber by over molding. The stress release portion 1021 formed with relatively soft insulating rubber may be bent and bear external pull forces, so as to prevent the cable body 101 from cracking or falling off caused by extraordinarily large stress when pulled by external forces. The first end of the joint portion 1022 is formed on the end surface of the second end of the stress release portion 1021. In one embodiment, the shape of the joint portion 1022 may include but be not limited to cylinder. Lock bodies 1023 are formed on two opposite side surfaces of the second end of the joint portion 1022 and extend therefrom. Restriction grooves 1024 are formed between the stress release portion 1021 and the lock bodies 1023. The terminal portion 1025 is formed on the end surface of the second end of the joint portion 1022. In one embodiment, a through hole 1026 may be formed through the terminal portion 1025, the joint portion 1022 and the stress release portion 1021 to receive the conductive stranded wires in the cable body 101. In one embodiment, the joint portion 1022, the lock bodies 1023 and the terminal portion 1025 may be formed with relatively hard insulating rubber by inner molding.

Figure 5:
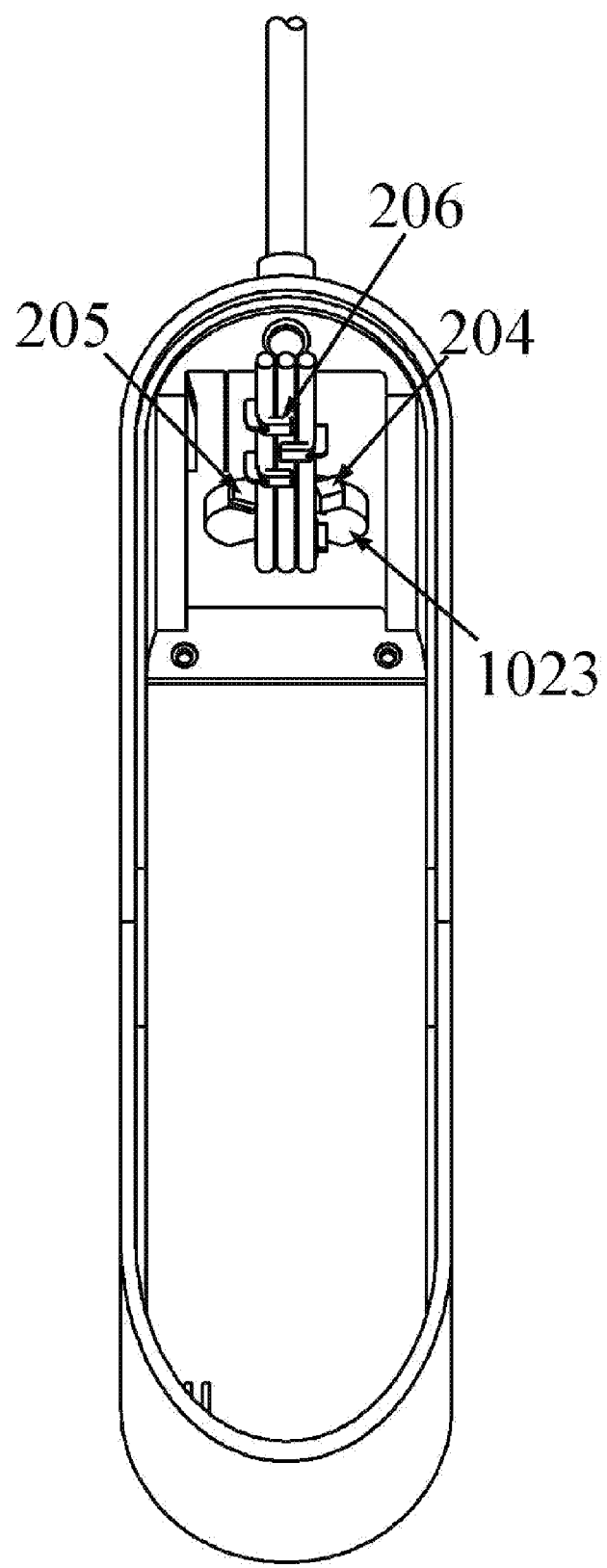
FIG. 5 illustrates a diagram showing the assembling steps of the cable fixing assembly in accordance with one embodiment of the present invention.

In one embodiment of the present invention, as shown in FIGS. 2 and 4, the combinative case 20 includes a case 207 and a fixing board 201. With reference to FIG. 2, a joint hole 202 is formed through the fixing board 201. The shape of the joint hole 202 matches the entire shape of the joint portion 1022 and the two lock bodies 1023. In one embodiment, the shape of the joint hole 202 may be a circle which has two annular sectors extending from two opposite sides of the circle. Position fixing regions 203 are formed on the fixing board 201 and adjacent to two sides of the joint hole 202 without the annular sectors. The annular-sector portions of the joint hole 202 have an outer arc and two short edges at two sides. A blocking slice 205 and a no-return block 204 are disposed adjacent to the two short edges of the annular-sector portions of the joint hole 202 respectively. The two blocking slices 205 and the two no-return blocks 204 are diagonally disposed. As shown in FIG. 2, the no-return blocks 204 have a guiding slope 2041 inclining towards a clockwise direction and a no-return surface 2042 vertically extending from the top of the guiding slope 2041 to the position fixing region 203. The blocking slice 205 has a blocking surface 2051 vertical to the position fixing region 203. With reference to FIGS. 2 and 5, one or a plurality of hooks 206 are disposed on the fixing board 201 left-right staggeredly in order for the concave portion of the hook 206 to receive the conductive stranded wires exposed from the cable head 102. In one embodiment, the horizontal position of the plurality of hooks 206 may be generally aligned with that of the joint hole 202, so as to bend the conductive stranded wires exposed from the cable 10 upwards and position them in the concave portion of the hook 206. As shown in FIG. 4, a through hole 208 is disposed in the side wall of the case 207 at a height corresponding to the height of the joint hole 202 to render the cable body 101 of the cable 10 to pass therethrough.

With reference to FIGS. 1 to 5, in one embodiment of the present invention, the cable head 102 of the cable 10 containing the conductive stranded wires is aligned with the joint hole 202 in the fixing board 201. Then, the joint portion 1022, the lock bodies 1023, the terminal portion 1025 and the exposed conductive stranded wires are inserted into the joint hole 202, and the restriction groove 1024 corresponds to the side wall of the joint hole 202. Subsequently, the cable 10 is rotated clockwise to render the lock bodies 1023 to touch the guiding slope 2041 of the no-return block 204, move on the guiding slope 2041, be slightly plastic-deformed to cross the guiding slope 2041, further move into the position fixing region 203, and be locked by the no-return surfaces 2042 of the two no-return blocks 204 and the blocking surfaces 2051 of the two blocking slices 205. The lock bodies 1023 are not able to rotate counterclockwise inversely, and the cable is directly fixed on the fixing board 201 of the combinative case 20 and is not detachable from the fixing board 201. Then, as shown in FIG. 4, the fixing board 201 with the cable 10 fixed thereon is positioned in the case 207, and the cable body 101 of the cable 10 is inserted into the through hole 208 in the case 207 to render the fixing board 201 to be attached to the side wall of the case 207. In one embodiment, heat welding method or any other methods, such as screw fastening method, may be employed to fix the fixing board 201 on the case 207. Subsequently, as shown in FIG. 5, the conductive stranded wires exposed from the cable head 102 may be bent upwards and be positioned in the concave portion of the hook 206 on the fixing board 201. Therefore, not only the cable 10 can be fixed onto the fixing board 201, but also the conductive stranded wires exposed from the cable head 102 can be fixed or hidden.

The foregoing description is a preferred embodiment of the present invention. It should be appreciated that this embodiment is described for purposes of illustration only, not for limiting, and that numerous alterations and modifications may be practiced by those skilled in the art without departing from the spirit and scope of the present invention. It is intended that all such modifications and alterations are included insofar as they come within the scope of the present invention as claimed or the equivalents thereof.

What is claimed is:

1. A cable fixing assembly, comprising:
 a cable comprising:
  a cable body, and
  a cable head disposed on an end of said cable body, said cable head comprising:
   a stress release portion, a first end of said stress release portion being connected to said end of said cable body,
   a joint portion, a first end of said joint portion being disposed on an end surface of a second end of said stress release portion, and
   a lock body disposed on two opposite side surfaces of a second end of said joint portion and extending from said second end of said joint portion, wherein said lock body is annular sector shaped;
   a terminal portion disposed on an end surface of said second end of said joint portion, wherein a through hole is formed through said terminal portion, said joint portion and said stress release portion to receive said conductive stranded wires; and a fixing board comprising:
- a joint hole formed through said fixing board, a shape of said joint hole matching an entire shape of said joint portion and said lock body,
- at least one no-return block formed on said fixing board and adjacent to said joint hole, wherein said at least one no-return block comprises a guiding slope and a no-return surface, wherein said guiding slope inclines upward from said fixing board and said no-return surface vertically extends from the top of the guiding slope to the position of said fixing board, and
- a plurality of hooks is lined in staggered in order for the concave portion of said hook to receive the conductive stranded wires exposed from said cable head;

wherein said joint portion and said lock body are inserted into said joint hole and are rotated by an angle, and said lock body moves on said guiding slope and is locked by said no-return surface.

2. The cable fixing assembly of claim 1, wherein said fixing board further comprises at least one blocking slice disposed on said fixing board, adjacent to said joint hole and opposite to said no-return block.

3. The cable fixing assembly of claim 2, wherein said joint portion is cylinder shaped.

4. The cable fixing assembly of claim 3, wherein said shape of said joint hole is a circle which has two annular sectors extending from two opposite sides of said circle.

5. The cable fixing assembly of claim 4, wherein said no-return block and said blocking slice are disposed adjacent to two edges of said annular sectors of said joint hole respectively.

6. The cable fixing assembly of claim 2, wherein said blocking slice has a blocking surface.

7. The cable fixing assembly of claim 2, wherein there are two blocking slices and two no-return blocks.

8. The cable fixing assembly of claim 7, wherein said two blocking slices are disposed diagonally and said two no-return blocks are disposed diagonally.

9. The cable fixing assembly of claim 1, further comprising a case to receive said fixing board and combine with said fixing board.

10. The cable fixing assembly of claim 9, wherein said case comprises a through hole formed through a side wall of said case to render said cable body to pass through said through hole.

11. The cable fixing assembly of claim 1, wherein a restriction groove is formed between said lock body and said stress release portion.

\* \* \* \* \*